US010809223B2

(12) United States Patent
Fanselow et al.

(10) Patent No.: US 10,809,223 B2
(45) Date of Patent: Oct. 20, 2020

(54) SENSOR

(71) Applicant: Endress+Hauser Conducta GmbH+Co. KG, Gerlingen (DE)

(72) Inventors: Christian Fanselow, Geringswalde (DE); Erik Hennings, Freiberg (DE); Alexander Hörig, Geringswalde (DE); Andreas Löbbert, Waldheim (DE); Magdalena Losik-Strassberger, Gohrisch (DE); Stefan Wilke, Halle (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 92 days.

(21) Appl. No.: 16/031,103

(22) Filed: Jul. 10, 2018

(65) Prior Publication Data

US 2019/0011393 A1 Jan. 10, 2019

(30) Foreign Application Priority Data

Jul. 10, 2017 (DE) .......................... 10 2017 115 420

(51) Int. Cl.
*G01N 27/404* (2006.01)
*G01N 21/77* (2006.01)
(Continued)

(52) U.S. Cl.
CPC .......... *G01N 27/4045* (2013.01); *G01N 21/77* (2013.01); *G01N 21/8507* (2013.01);
(Continued)

(58) Field of Classification Search
CPC ............. G01N 27/404; G01N 27/4045; G01N 27/333; G01N 27/3335; G01N 2021/0106;
(Continued)

(56) References Cited

U.S. PATENT DOCUMENTS 3,689,394 A * 9/1972 Davies et al. ....... G01N 27/404
204/412
2002/0033334 A1 3/2002 Tschuncky et al.
(Continued)

FOREIGN PATENT DOCUMENTS

DE 102016110696 A1 12/2017
DE 102016117628 A1 3/2018
(Continued)

OTHER PUBLICATIONS

Tokoro et al., "Image Analysis of Hydrophobicity of Silicone Rubber Insulator," IEEE 1999 Conference on Electrical Insulation and Dielectric Phenomena, pp. 763-766 (Year: 1999).*
(Continued)

*Primary Examiner* — Alexander S Noguerola
(74) *Attorney, Agent, or Firm* — Mark A. Logan; Endress+Hauser (USA) Holding Inc.

(57) ABSTRACT

The present disclosure relates to a sensor for determining measured values of a measured variable representing an analyte content in a measuring fluid, comprising a measuring probe with a probe housing that comprises an immersion region provided for immersion into the measuring fluid, and a single-layer or multi-layer membrane arranged in the immersion region, wherein the membrane comprises at least a first layer that is formed from a polymer and comprises a superhydrophobic surface that is in contact with the measuring fluid when the immersion region is immersed in the measuring fluid.

11 Claims, 2 Drawing Sheets

(51) Int. Cl.
 *G01N 21/85* (2006.01)
 *G01N 27/40* (2006.01)
 *G01N 27/333* (2006.01)

(52) U.S. Cl.
 CPC ....... *G01N 27/404* (2013.01); *G01N 27/3335* (2013.01); *G01N 27/40* (2013.01); *G01N 2021/775* (2013.01)

(58) Field of Classification Search
 CPC ... G01N 2021/0112; G01N 2021/7759; G01N 21/7703; G01N 21/8507
 See application file for complete search history.

(56) References Cited

U.S. PATENT DOCUMENTS

| | | | |
|---|---|---|---|
| 2002/0168296 A1 | 11/2002 | Gambert | |
| 2009/0118420 A1 | 5/2009 | Zou et al. | |
| 2017/0356839 A1* | 12/2017 | Hennings | ............... G01N 27/31 |

FOREIGN PATENT DOCUMENTS

| | | | | |
|---|---|---|---|---|
| GB | 1200595 | * | 7/1970 | ............ H01M 27/04 |
| WO | 2010023067 A1 | | 3/2010 | |

OTHER PUBLICATIONS

EPO computer-generated English language translation of WO 2010023067, downloaded Sep. 15, 2020 (Year: 2010).*
Search Report for German Patent Application No. 10 2017 115 420.5, German Patent Office, dated Apr. 30, 2018, 6 pp.

* cited by examiner

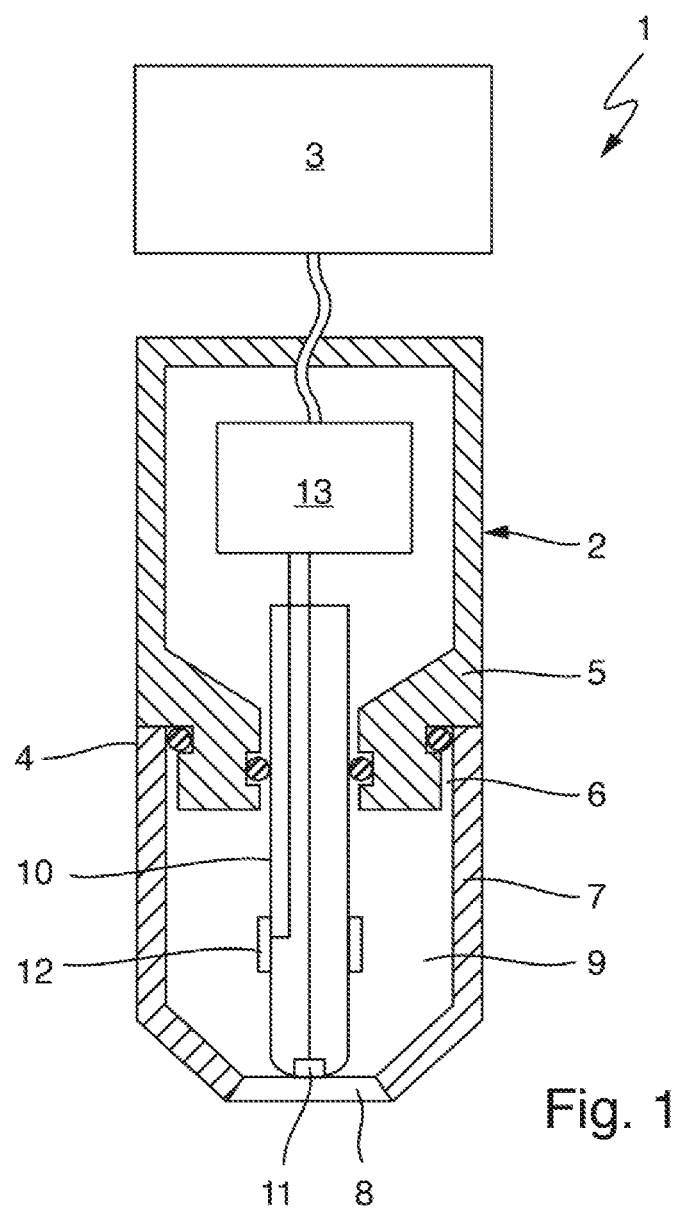
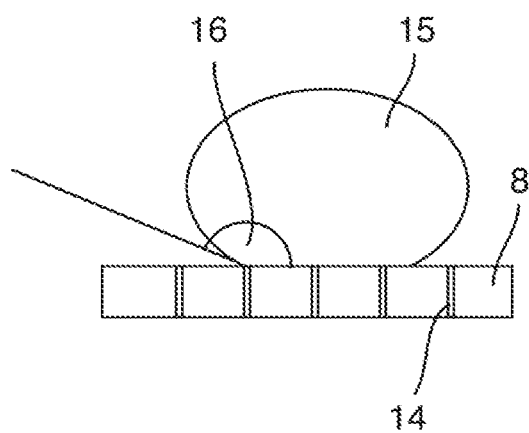

SENSOR

CROSS-REFERENCE TO RELATED APPLICATION

The present application is related to and claims the priority benefit of German Patent Application No. 10 2017 115 420.5, filed on Jul. 10, 2017, the entire contents of which are incorporated herein by reference.

TECHNICAL FIELD

The present disclosure relates to a sensor for determining measured values of a measured variable that represents an analyte content, in particular of a gaseous analyte, in a measuring fluid.

BACKGROUND

Such sensors can be used in analytical measuring technology, for example in analytic applications in process technology, in the laboratory, or in environmental measuring technology. An analyte is understood in this case as a chemical substance or a plurality of different chemical substances whose fraction in the measuring fluid, represented by a concentration, an activity, or a partial pressure, for example, is to be detected by means of a sensor.

Both optochemical and electrochemical sensors that serve to determine a measured variable representing an analyte content in a measuring fluid often comprise a measuring probe that can be immersed into a measuring fluid, e.g., a measuring liquid or a measuring gas. This measuring probe may comprise a measurement circuitry that is used to generate measurement signals representing measured values of the measured variable. The measurement circuitry may be designed to output measurement signals to a higher-level unit, e.g., a higher-level electronic sensor system, such as a measuring transducer or another electronic system for measurement value processing. Many optochemical and electrochemical measuring probes comprise a membrane that is brought into contact with the measuring fluid in order to detect measurement signals. In measuring probes that work according to an optochemical measurement principle, this membrane serves a different function than the membrane of electrochemical measuring probes.

The membrane of electrochemical measuring probes oftentimes terminates a housing chamber that is arranged in the measuring probe, said housing chamber containing an internal electrolyte, and forms a diffusion barrier between the internal electrolyte and the measuring fluid that is permeable to the analyte so that the analyte can arrive from the measuring fluid into the internal electrolyte or can diffuse from the housing chamber back into the measuring fluid. The analyte concentration in the internal electrolyte thus correlates with the analyte concentration in the measuring fluid. Such an electrochemical measuring probe is described in DE 10 2008 039465 A1, for example. This measuring probe works according to an amperometric measurement principle and comprises two or three electrodes that are arranged in the housing chamber and are in contact with the internal electrolyte. One of these electrodes serves as working electrode; another electrode serves as counter electrode. Between these electrodes, a predetermined voltage is applied by means of a measurement circuitry (or adjusted by means of a third electrode) and the diffusion-limited current flowing through the internal electrolyte between the working electrode and the counter electrode at this voltage is detected. This diffusion-limited current is used as a measure of the analyte content of the internal electrolyte, and thus also as a measure of the analyte concentration in the measuring fluid.

Another type of electrochemical measuring probes that have a membrane and serve as diffusion barriers between a housing chamber filled with an internal electrolyte and the measuring fluid are Severinghaus sensors (also called Severinghaus electrodes). Such sensors can, for example, be used to determine the concentration of $NH_3$ or $CO_2$ in a measuring liquid, or a partial pressure of $NH_3$ or $CO_2$ in a measuring gas. As in the case of the amperometric measuring probes described above, the membrane of a Severinghaus sensor is permeable to the analyte so that a concentration of the analyte or of a reaction product of the analyte arises in the internal electrolyte, said concentration depending on the analyte content of the measuring fluid. A potentiometric measuring sensor that generates an electrical measurement signal dependent on the analyte concentration or the concentration of a reaction product of the analyte in the internal electrolyte is arranged in the housing chamber. Severinghaus sensors for measuring a $CO_2$ content of a measuring fluid comprise a potentiometric pH measuring sensor, for example. This pH measuring sensor detects the pH value of the internal electrolyte, which changes as a result of the diffusion of $CO_2$ from the measuring fluid into the internal electrolyte or from the internal electrolyte into the measuring fluid.

The membranes of the electrochemical sensors described here can consist of polymers, such as PTFE or silicone. They have the smallest pores, which may, for example, be produced by particle bombardment. Membranes produced in this way are also called nuclear track membranes. It is known to mechanically reinforce membranes of electrochemical measuring probes by means of a supporting structure, e.g., by means of a supporting metallic grid as described in DE 10 2008 039465 A1.

The membrane of optochemical sensors, e.g., optochemical oxygen, ozone, or $CO_2$ sensors, often comprise several layers, e.g., polymer layers, arranged on top of each other. The individual layers may in this case have different functions, wherein an indicator substance that serves to determine the measured value using optical means is contained in at least one of the layers. An optochemical sensor generally also comprises a radiation receiver and a radiation source, both of which may be integrated into the measuring probe, for example. The radiation source and the radiation receiver can serve to induce a luminescence of the indicator substance and to detect luminescent radiation emitted by the indicator substance. In some applications, the radiation source and the radiation receiver may also be used for absorption measurements, in which measuring radiation emitted by the radiation source is irradiated into the membrane with the indicator substance, and the measuring radiation changed by absorption is detected. Optochemical sensors also comprise a measurement circuitry which serves to control the radiation source and to generate a measurement signal based on a primary signal output by the radiation receiver. The membrane is often applied onto a substrate, e.g., onto a small glass plate or an optical fiber, to form a sensor spot. In optochemical measuring probes based on the principle of an analyte-induced luminescence or luminescence extinction, the indicator substance is an organic dye adapted to the analyte, e.g., what is known as a luminophore or fluorophore. When the membrane is in contact with the measuring fluid, interaction of the luminophore with the analyte results in an attenuation of the luminescence intensity of the luminophore as a function of the analyte content of the measuring fluid. Optochemical measuring probes and their membranes are known, for example, from WO 2005/100957 A1, DE 10051220 A1, and DE 10 2014 112972 A1.

The membranes of these optochemical measuring probes often comprise at least one layer that is made of silicone or Teflon that is intended for direct contact with the measuring fluid and is permeable at least to the analyte but generally also to water.

All membranes known from the prior art and described here absorb water in principle, or at least under certain conditions. As a result, the membranes swell, which is normally associated with changes of the membrane properties that may also influence the quality of the measurement. The membranes are moreover often susceptible to what is known as biofouling, i.e., to the accumulation of biological fouling matter on their side facing the measuring fluid.

SUMMARY

It is therefore the object of the present disclosure to specify a sensor of the aforementioned type having a membrane that absorbs no water or, at the most, a negligible amount of water when in contact with moist or aqueous measuring fluids, and is less susceptible to biofouling.

This object is achieved according to the present disclosure by a sensor according to claim 1. Advantageous embodiments are listed in the dependent claims.

The sensor according to the present disclosure for determining measured values of a measured variable that represents an analyte content, in particular of a gaseous analyte, in a measuring fluid comprises a measuring probe with a probe housing that comprises an immersion region provided for immersing into the measuring fluid and a single-layer or multi-layer membrane arranged in the immersion region, wherein the membrane comprises at least a first layer that is formed from a polymer and has a superhydrophobic surface that is in contact with the measuring fluid when the immersion region is immersed in the measuring fluid.

A surface is referred to as "superhydrophobic" if the surface forms a contact angle of more than 150°, i.e. of between 150° and 180°, with the droplets of water lying on the surface. A superhydrophobic surface can therefore barely be wetted by water (technical term: "non-wetting").

As the surface of the membrane that contacts the measuring fluid during measurement operation has superhydrophobic properties, both undesired penetration of water into the membrane and growing of biological material on the membrane are effectively prevented. The superhydrophobic membrane thus not only allows for a very reliable operation of the sensor but can also be used very advantageously in hygienic applications, e.g., in processes that are jeopardized by the penetration and carrying of germs or other biological substances. Such processes are, for example, processes of the food industry or pharmaceutical or biotechnological processes.

As will be explained below, depending on its function in the respective sensor, the membrane may be formed from a single layer which may have superhydrophobic properties as a whole, or consist of several layers, wherein at least one surface of one of the layers is superhydrophobic, in particular the surface of the topmost layer—i.e., the layer facing the measuring fluid—of the membrane that is in contact with the measuring fluid during measurement operation.

The at least one first layer may consist of a polymer, e.g., PVDF (polyvinylidene fluoride) or PTFE (polytetrafluoroethylene). To the extent that the membrane is formed from only a single layer, the entire membrane may thus consist of polymer and have a corresponding superhydrophobic surface. This surface may already be produced during the manufacturing of the membrane from the polymer or by a subsequent treatment of the surface, e.g., by a plasma treatment. Superhydrophobic PVDF membranes are advantageous not only because of their superhydrophobicity but also because of their relatively high mechanical stability.

The at least one first layer may be permeable to the analyte. For example, the first layer may have pores through which an analyte, in particular a gaseous analyte, can diffuse. The inner surfaces of the pores are advantageously also superhydrophobic, so that it is ensured that the analyte but not water can pass the membrane through the pores. This has the advantage that the membrane does not absorb any water and thus also cannot swell, but that the analyte on the other hand can arrive through the membrane or, in the case of a multi-layer membrane, through the respective layer into lower layers in order to make measured value detection possible.

The at least one first layer may have a thickness of 1 to 200 µm, advantageously between 50 and 180 µm, or even between 100 and 150 µm. When the membrane consists of only this one layer, the thickness may advantageously be between 50 and 200 µm in order to ensure a fast response time of the sensor to a change of the measured variable in the measuring fluid on the one hand and a sufficient mechanical stability of the membrane on the other hand. In this way, a supporting structure may be dispensed with. A disadvantage of many of the supporting structures traditionally used in the prior art, such as supporting metallic grids, is the mechanical stressing of the membrane at the contact points between the membrane and the supporting structure, which can even result in tearing of the membrane. As membrane material, PVDF is stable enough to be able to dispense with a supporting structure in single-layer membranes of the aforementioned thickness.

When the membrane comprises other layers in addition to the at least one first layer, the first layer advantageously has a thickness between 1 and 200 µm when the first layer has pores. A non-porous first layer advantageously has a thickness between 1 and 50 µm.

In one embodiment, the probe housing of the sensor may comprise at least one probe body and a probe cap connected to the probe body so as to be releasable, wherein the probe cap is formed from a cap base body and the membrane fixed on the cap base body. As the membrane is part of a probe cap fixed on the probe housing so as to be releasable, an easy and fast exchange of the membrane is possible in the event that this is damaged or no longer allows for a reliable measurement operation of the sensor because of aging phenomena. The membrane can be connected to the cap base body by means of a glued, welded, or clamped connection. All components of the sensor that are not subject to substantial wear, such as a measurement circuitry or, if applicable, a radiation source and a radiation receiver, may be arranged in the probe body.

In one embodiment, a housing chamber that is closed by the membrane may be formed in the probe housing. In this embodiment, the sensor may be an electrochemical sensor, e.g., an amperometric sensor or a potentiometric Severinghaus sensor. In the housing chamber, an internal electrolyte can be contained which contacts the membrane at its rear surface facing the housing chamber. In this embodiment, the membrane has pores, for example, by way of which the analyte, in particular a gaseous analyte, can diffuse through the membrane both from the measuring fluid into the internal electrolyte and, in the opposite direction, from the internal electrolyte into the measuring fluid. In a state of equilibrium, the concentration of the analyte or of a reaction product of the analyte in the internal electrolyte is in this way a measure of the analyte content (e.g., an analyte partial pressure or an analyte concentration or analyte activity) of the measuring fluid contacting the membrane. The sensor can be designed to determine a $CO_2$, $NH_3$, $O_2$, $Cl_2$, $ClO_2$ content or another gas content of a measuring fluid, in particular of a measuring gas or a measuring liquid.

In a development of this embodiment, the surface of the membrane facing the measuring fluid, the rear surface of the membrane facing the internal electrolyte, and the inner surfaces of the pores are advantageously superhydrophobic. If the internal electrolyte is an aqueous solution containing at least one electrolyte salt, no water from the housing chamber may thus arrive through the membrane into the measuring fluid and/or penetrate into the membrane and change its properties. In this embodiment, a penetration of water into the membrane or through the membrane in both directions, i.e., both from the internal electrolyte to the measuring fluid as well as in the opposite direction, is prevented.

At least two electrodes that are in contact with the internal electrolyte may be arranged in the housing chamber, wherein the measuring probe comprises a measurement circuitry that is arranged in the probe housing outside the housing chamber and is connected in an electrically conductive manner to the electrodes. For example, exactly two electrodes may be arranged in the housing chamber, wherein one of the electrodes serves as working electrode and the other electrode serves as counter electrode. The measurement circuitry may in this instance be designed to carry out amperometric measurements, i.e., to apply a predetermined voltage between the electrodes, wherein the voltage is selected such that analyte contained in the internal electrolyte is electrochemically converted at the working electrode. The diffusion-limited current arising in this case between the electrodes through the internal electrolyte is detected by means of the measurement circuitry, which generates an electrical measurement signal representing this current. This measurement signal may be an analog or a digital signal. Since the diffusion-limited current represents a concentration of the analyte or of a reaction product of the analyte in the internal electrolyte, and since the concentration of the analyte or of its reaction product is a measure of the analyte content of the measuring fluid, a measured value of the measured variable can be determined based on the measurement signal.

The measurement circuitry may comprise a communication interface via which it may be connected to a higher-level electronic sensor system. This higher-level electronic sensor system may be accommodated together with the measurement circuitry in the probe housing or in a higher-level unit connected by wire or wirelessly for communication to the measuring probe, said higher-level unit being, for example, a measuring transducer or another operating unit, e.g., an in particular portable computer, such as a tablet, a smartphone, a smartwatch, data glasses, or the like. The measurement circuitry may furthermore be designed to output measurement signals via the communication interface to the higher-level electronic sensor system. The higher-level electronic sensor system may be designed to receive and process the measurement signals, in particular to determine measured values of the measured variable from the measurement signals and to output and/or display them.

In an alternative embodiment, a third electrode serving as reference electrode may be arranged in the housing chamber in addition to the working electrode and the counter electrode. The measurement circuitry is in this instance designed to regulate the potential of the working electrode with respect to a potential of the reference electrode, and to detect a current thereby flowing between the working electrode and the counter electrode and to output a corresponding measurement signal. The measurement circuitry may analogously be designed to output measurement signals to a higher-level electronic sensor system as described above for a sensor with two electrodes, said electronic sensor system again determining measured values of the measured variable based on the measurement signals.

In an alternative embodiment, the measuring probe can comprise a potentiometric measuring sensor that is at least partially arranged in the housing chamber and in contact with the internal electrolyte, which potentiometric measuring sensor is designed to generate a measurement signal dependent on a pH value of the internal electrolyte. This embodiment corresponds to one of the above-described Severinghaus sensors, which may, for example, serve to determine an $NH_3$ or $CO_2$ content of the measuring fluid. The potentiometric measuring sensor comprises a measuring half cell and a reference half cell, both of which are in contact with the internal electrolyte. In this embodiment, the measuring probe also comprises a measurement circuitry that is arranged in the probe housing outside the electrolyte-filled housing chamber and serves to detect a voltage arising between the measuring half cell and the reference half cell during contact with the internal electrolyte, and to generate a measurement signal representing this voltage. The measurement circuitry may comprise a communication interface via which it may be connected to a higher-level electronic sensor system. As in the above-described embodiment of the sensor as an amperometric sensor, this higher-level electronic sensor system may be accommodated together with the measurement circuitry in the probe housing or in a higher-level unit connected to the measuring probe by wire or wirelessly for communication, said higher-level unit being, for example, a measuring transducer or another operating unit like those mentioned above. The measurement circuitry may furthermore be designed to output measurement signals via the communication interface to the higher-level electronic sensor system. The higher-level electronic sensor system may be designed to receive and process the measurement signals, in particular to determine measured values of the measured variable from the measurement signals and to output and/or display them.

In another embodiment, the sensor may also be an optochemical sensor. In this case, the membrane is generally made up of several layers. In addition to the first layer with the superhydrophobic surface, the membrane may comprise a second layer arranged on a side of the first layer that is facing away from the measuring fluid, wherein the second layer comprises an indicator substance. The membrane may comprise additional layers arranged between the first and the second layer and/or on the side of the second layer facing away from the first layer. In this embodiment, the first layer may have pores through which the analyte, e.g., a gaseous analyte, but not water arrives into the second layer. The first layer may also be designed to be so thin that the analyte can diffuse through the first layer even if it does not have any pores. The membrane may comprise additional layers, one of which may, for example, form a screening layer that serves to block out ambient light impinging on the membrane from the side of the measuring fluid. Additional layers may serve to protect the indicator substance from being washed out of the membrane or from photochemically induced aging. On its side facing away from the measuring fluid, the membrane may be applied onto a transparent substrate. In this embodiment, the measuring probe may moreover comprise a radiation source arranged in the probe housing and a radiation receiver arranged in the probe housing. In a variant for luminescence measurement, the radiation source and the radiation receiver may be arranged in relation to the membrane such that the radiation source can radiate excitation radiation into the membrane and the radiation receiver can receive luminescent radiation emitted by the indicator material.

In this embodiment, the sensor may also comprise a measurement circuitry, arranged in the probe housing, that serves to control the radiation source and to process a signal of the radiation receiver and to generate a measurement signal derived from the signal of the radiation receiver. Analogously to the above-described embodiments, the measurement circuitry may comprise a communication interface via which it can be connected to a higher-level electronic sensor system. This higher-level electronic sensor system may be accommodated together with the measurement circuitry in the probe housing or in a higher-level unit connected to the probe by wire or wirelessly for communication, said higher-level unit being, for example, a measuring transducer or another operating unit like those mentioned above. The measurement circuitry may furthermore be designed to output measurement signals via the communication interface to the higher-level electronic sensor system. The higher-level electronic sensor system may be designed to receive and process the measurement signals, in particular to determine measured values of the measured variable from the measurement signals and to output and/or display them.

BRIEF DESCRIPTION OF THE DRAWINGS

The present disclosure is explained in further detail below on the basis of the exemplary embodiments shown in Figures.

FIG. 1 shows a schematic longitudinal section representation of a sensor according to a first exemplary embodiment (amperometric);

FIG. 2 shows a schematic representation of a droplet of water on a superhydrophobic surface of a membrane;

DETAILED DESCRIPTION

Figure 3:
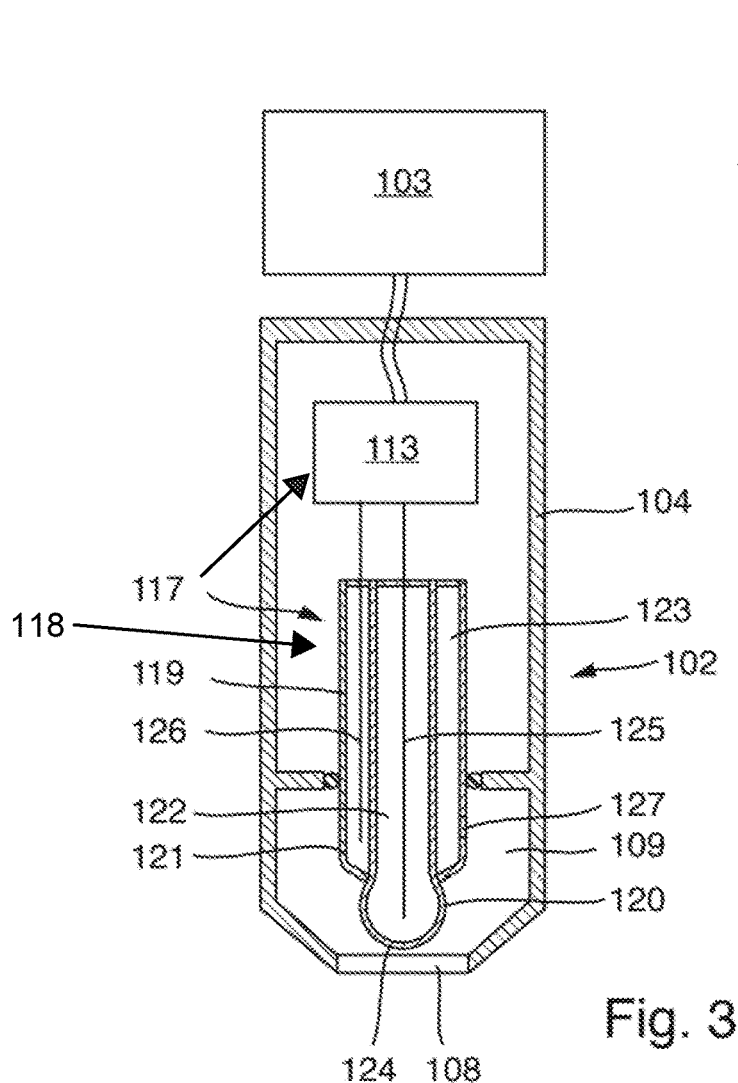
FIG. 3 shows a schematic longitudinal section representation of a sensor according to a second exemplary embodiment.

FIG. 1 shows an amperometric sensor 1 for determining a concentration of an analyte or a measured variable correlating with the concentration of an analyte in a measuring fluid. The analyte may be a gas, for example, such as oxygen, chlorine, or chlorine dioxide, contained in the measuring fluid, e.g., dissolved in a measuring fluid.

The sensor 1 comprises an essentially cylindrical measuring probe 2 and a higher-level electronic sensor system 3 that is connected to the measuring probe for communication and that may be a measuring transducer in the present example. Instead of a measuring transducer, another data processing device, e.g., a computer, a process control computer, a programmable logic controller, or an operating device configured for wireless communication, e.g., a tablet, a smartphone, a smartwatch, or data glasses, can also be used as higher-level electronic sensor system.

The measuring probe 2 comprises a probe housing 4 that is formed from two parts in the example shown, namely from a probe body 5 and a sensor cap 7 connected to the probe body 5 by means of a screw connection 6 so as to be releasable. In the present example, the probe housing 4 consists of stainless steel but may also be formed from an electrically non-conductive material, e.g., a polymer material such as PEEK, PTFE, PVC, or PVDF. The sensor cap 7 comprises an essentially cylindrical cap base body which tapers at its end facing away from the screw connection 6 that is intended for immersion into the measuring fluid. This end is closed by a membrane 8, which is firmly connected to the cap base body, e.g., by a material connection such as a glued or welded connection, or by a positive connection, e.g., by a clamped connection.

The sensor cap 7 and the probe body 5 enclose a housing chamber 9, which in the present example is filled with an aqueous electrolyte solution serving as internal electrolyte. The internal electrolyte in the housing chamber 9 may be thickened slightly with a polymer. On the rear side, i.e., on its side facing away from the membrane 8, the housing chamber 9 is sealed in a liquid-tight manner by means of two seals so that the internal electrolyte does not get into the probe body 5 and also cannot exit the probe housing 4 through the screw connection 6.

The measuring probe 2 furthermore comprises a rod-shaped electrode body 10, the front section of which faces the membrane 8 and is arranged in the housing chamber 9 and which is mounted on the rear side on the probe body 5. The electrode body 10 consists in the present example of an electrically non-conductive material, e.g., a polymer material such as PEEK, PTFE, or PVDF, or of glass. Embedded into the electrode body 10 is a first electrode, which is called working electrode 11 below and which is exposed at the end face of the electrode body 10 opposite the membrane 8 so that the working electrode 11 is in contact with the internal electrolyte. Otherwise, the electrode body 10 electrically insulates the working electrode 11 from the internal electrolyte. At least at its exposed end, the working electrode 11 can be formed from a noble metal, e.g., gold. A ring-shaped or sleeve-shaped second electrode, called a counter electrode 12 below, is moreover placed onto the electrode body 11 in a region that is wetted by the internal electrolyte. This counter electrode 12 may be formed from silver, for example. Both the working electrode 11 and the counter electrode 12 are electrically conductively connected to a measurement circuitry 13 that is arranged in the probe body and designed to apply a predetermined voltage between the working electrode 11 and the counter electrode 12, the voltage being selected such that the analyte is electrochemically converted at the working electrode 11. If the measured variable to be determined by means of the sensor 1 is an oxygen concentration or a chlorine dioxide concentration, for example, the working electrode 11 is connected as cathode and the counter electrode is connected as anode in order to detect measured values.

The working electrode 11 abuts against the membrane 8 such that only a thin film of the internal electrolyte forms between the working electrode 11 and the membrane 8. In this way, a fast response time is ensured.

The measurement circuitry is furthermore designed to detect a diffusion-limited current flowing when voltage is applied from the current flowing through the internal electrolyte between the working electrode 11 and the counter electrode 12, and to generate a measurement signal based thereon and to output it to the higher-level electronic sensor system 3. This electronic sensor system 3 can determine a measured value of the measured variable based on the measurement signal received, where applicable using a calculation rule previously determined by calibration, and output it.

In the present example, the membrane 8 is formed from PVDF (polyvinylidene fluoride) and has a plurality of small pores through which gaseous analyte present in the measuring fluid can diffuse into the housing chamber 9. Diffusion in the opposite direction is also possible. The surface of the membrane 8, including the inner surfaces of the pores 14, is superhydrophobic. Superhydrophobicity of a PVDF membrane surface can, for example, be achieved by a surface treatment. The membrane 8 formed from PVDF is mechanically stable even without an additional supporting structure.

FIG. 2 shows a detail of the superhydrophobic PVDF membrane 8 with pores 14 indicated schematically. A droplet of water 15 applied onto the membrane 8 forms a contact angle 16 of more than 150° at the phase boundary of the gaseous, liquid, and solid phase. The membrane 8 is thus not wettable by water, or is wettable by water only to a very small extent. This also applies similarly to electrolyte solutions based on water as solvent, in particular also to aqueous measuring fluids such as mist, water, wastewater, or drinking water, and to the internal electrolyte contained in the housing chamber 9 of sensor 1. The inner surfaces of the pores 14 are also superhydrophobic. This is advantageous because the diffusion of water in and through the membrane 8 is thus effectively prevented, and changes of the properties of the membrane relevant to the measurement as a result of the swelling of the membrane 8 and changes of the composition of the internal electrolyte, which is also relevant to the measurement, are thus prevented. An analyte, in particular a gaseous analyte such as $O_2$, $ClO_2$, $Cl_2$, can on the other hand pass through the membrane 8 by way of the pores 14.

FIG. 3 schematically shows a potentiometric Severinghaus sensor 101, which serves to measure a $CO_2$ content of a measuring fluid. The sensor 101 comprises a measuring probe 102 that can be immersed into the measuring fluid at least in a front immersion region, and a higher-level electronic sensor system 103, e.g., in the form of a measuring transducer, that can be connected to the measuring probe 102 for communication. The electronic sensor system 103 can for its part be connected to a higher-level unit, e.g., a process control center, for communication. The electronic sensor system 103 may be designed very analogously to the electronic sensor system 3 of the amperometric sensor 1 shown in FIG. 1.

The measuring probe 102 comprises a probe housing 104 which is formed integrally in the exemplary embodiment shown here. It may, however, also consist of several parts very analogous to the sensor 1 shown in FIG. 1, e.g., it may be formed from a probe body and an exchangeable probe cap. The probe housing may, for example, be formed from stainless steel or from a plastic. A housing chamber 109 that is filled with an internal electrolyte, e.g., an electrolyte solution based on water as solvent, is formed in the probe housing 104. At its end intended for contact with the measuring fluid, the housing chamber 109 is closed by a membrane 108. Like the membrane 8 described based on the first exemplary embodiment (FIGS. 1 and 2), the membrane 108 is designed as a single-layer, superhydrophobic PVDF membrane with a plurality of pores that allow passage of gaseous $CO_2$ but are impermeable to water. An adulteration of the measurement due to the penetration of water into the housing chamber 109 or into the membrane 108 is prevented in this way, as described.

The measuring probe 102 furthermore comprises a potentiometric measuring sensor 117 which has a combination pH electrode 118 and a measurement circuitry 113. The combination pH electrode 118 comprises a housing 119 which is made of an electrically insulating material and in which a measuring half cell 120 and a reference half cell 121 are accommodated. The potentiometric measuring sensor may of course also be designed differently, e.g., the measuring half cell and the reference half cell may be designed to be separate from each other, or the potentiometric measuring sensor may be designed to be miniaturized, e.g., in the form of a chip. The reference half cell 121 and the measuring half cell 120 are in contact with the internal electrolyte contained in the housing chamber 109 in order to measure a pH value of said internal electrolyte.

Two chambers are formed in the housing 119, wherein a first chamber serves as measuring half cell chamber 122 and a second chamber serves as reference half cell chamber 123. At its end facing the membrane 108, the measuring half cell chamber 122 is closed by a pH-sensitive glass membrane 124. The measuring half cell chamber 122 contains a pH buffer solution which is, where applicable, thickened slightly with a polymer and into which is immersed a sinking electrode 125 which may, for example, comprise a silver chloride-coated silver wire. The buffer solution may contain a high concentration of an alkali halide, such as KCl. The reference half cell chamber 123 contains a reference electrolyte which is, where applicable, thickened slightly with a polymer and which may contain a high concentration of an alkali halide, such as KCl. A reference electrode 126, which comprises a silver chloride-coated silver wire in the present example, is immersed into the reference electrolyte. Via a porous diaphragm 127 arranged in a wall of the reference half cell chamber 123, the reference electrolyte is in electrolytic contact with the internal electrolyte contained in the housing chamber 109. The sinking electrode 125 and the reference electrode 126 are led out of the housing 119 closed by adhesion or fusion on the rear side, and are in electrically conductive contact with the measurement circuitry 113. The measuring circuit 113 is designed to detect a difference in potential between the sinking electrode 125 and the reference electrode 126. This difference in potential is a measure of the pH value of the internal electrolyte contained in the housing chamber 109. The pH value of the internal electrolyte in turn is a measure of the $CO_2$ concentration in the internal electrolyte. Since $CO_2$ can diffuse through the membrane 108, a $CO_2$ concentration that depends on the $CO_2$ content of a measuring fluid contacting the membrane at its front side, facing away from the housing chamber 109, arises in the internal electrolyte. The difference in potential detected by the measurement circuitry 113 is thus a measurement signal dependent on the $CO_2$ content of the measuring fluid. The measurement circuitry 113 may be designed to further process, e.g., amplify and/or digitize, this measurement signal. The measurement circuitry 113 furthermore comprises communication means that serve to output the, where applicable, processed measurement signal to the higher-level electronic sensor system 103. The electronic sensor system 103 for its part comprises communication means, matching the communication means of the measurement circuitry 113, for receiving the measurement signal and which are designed to further process the received measurement signal. It may in particular be designed to determine a measured value of the $CO_2$ content of the measuring fluid from the measurement signal based on an association rule that is stored in the electronic sensor system 103, which association rule may, for example, be determined using calibration measurements, and to output said measured value.

Figure 4:
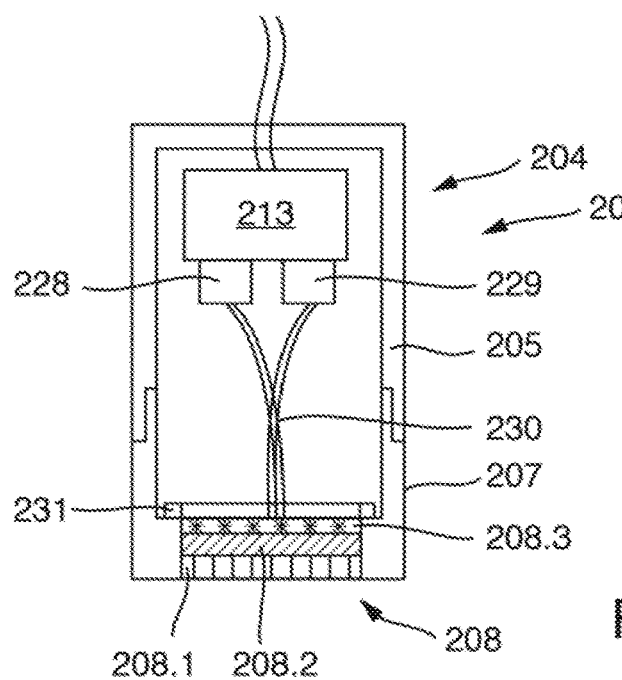
FIG. 4 shows a schematic longitudinal section representation of a measuring probe according to a third exemplary embodiment.

FIG. 4 shows a measuring probe 201 of an optochemical sensor that is designed to determine an oxygen content of a measuring fluid. The measuring probe 201 comprises a probe housing 204, which is formed from a probe body 205 and a probe cap 207 connected to the probe body 205 so as to be releasable. At a front end, the probe cap 207 comprises a glued or clamped membrane 208. This membrane 208 is designed in multiple layers and is described in detail further below.

Arranged in the probe housing 204 is a radiation source 228 and a radiation receiver 229 which are electrically conductively connected to a measurement circuitry 213 also arranged in the probe housing 204. By means of several light conductors 230, radiation of the radiation source 228 is directed toward the membrane 208 and radiation exiting the membrane 208 is directed to the radiation receiver 229. The radiation source 228 may, for example, comprise one or more light emitting diodes. The radiation receiver 229 may comprise one or more photoelectric elements, e.g., photodiodes or CCD elements.

The measurement circuitry 213 is designed to control the radiation source 228, and to receive signals of the radiation receiver 229 and process them into a measurement signal representing the measured variable, in this case the oxygen content of the measuring fluid. The measurement circuitry 213 also comprises a communication interface that is compatible with a higher-level electronic sensor system (not shown here), via which said measurement circuitry can output the measurement signal to the higher-level electronic sensor system.

The membrane 208 comprises several layers 208.1, 208.2, 208.3. A first layer 208.1 intended for contact with the measuring fluid is formed from PVDF, wherein at least the surface of this first layer that can be contacted by the measuring fluid is superhydrophobic, i.e., forms a contact angle of at least 150° with water or a liquid based on water. The first layer 208.1 may have a plurality of pores; however, it may also be free of pores. The first layer 208.1 is adjoined by a second layer 208.2. This second layer is formed from silicone into which a dark pigment, e.g., carbon black, is embedded. This second layer 208.2 serves as screening layer that prevents radiation from entering from outside into the lower layers of the membrane or into the light conductor 230. On its side facing away from the first layer 208.1, the second layer 208.2 is adjoined by a third layer 208.3. This third layer is also formed from a polymer, e.g., silicone. Into the third layer 208.3 is embedded a luminophore, the luminescence of which can be excited by radiation of the radiation source 228 and is extinguished by interaction with oxygen molecules. This luminescence extinction depends on the concentration of oxygen in the membrane 208, and thus on the oxygen content of the measuring fluid contacting the membrane. In this respect, an electrical measurement signal representing the oxygen content of the measuring fluid can be generated by means of the radiation receiver 229, which receives the luminescent radiation of the luminophore, and a measured value of the oxygen content can be determined by means of the measurement circuitry 213 or the higher-level electronic sensor system connected to the measurement circuitry. The layers 208.1, 208.2, 208.3 can be applied, e.g., by gluing, onto a substrate 231 that is transparent to the radiation of the radiation source and the luminescent radiation, which substrate 231 may be made of quartz glass, for example.

The manufacturing of the membrane 208 may, for example, take place according to one of the methods described below:

In a first method variant, an optochemical sensor spot which comprises the substrate 231, the layer 208.3 comprising the luminophore, and the layer 208.2 forming the screening layer can be sealed or welded into a superhydrophobic PVDF film either on one side, i.e., on the side intended for contact with the medium, or all around, so that the superhydrophobic PVDF film forms the outermost layer, intended for contact with the measuring fluid, of the membrane produced in this way.

In a second method variant, a superhydrophobic PVDF film can first be inserted into the probe cap 207, then an optochemical sensor spot that comprises the substrate 231, the layer 208.3 comprising the luminophore, and the layer 208.2 forming the screening layer can be placed onto the PVDF film and subsequently be pressed against the PVDF film. To this end, a component that is movable, e.g., by screwing, within the cap in the axial direction and can be pressed against the rear side of the membrane 208 facing away from the measuring fluid can be provided in the sensor cap so that the PVDF film, as final first layer 208.1 of the membrane 208, tightly abuts against the uppermost layer of the sensor spot, i.e., against the screening layer 208.2 in the present example.

In a third method variant, several additional layers—in the present example, the screening layer 208.2 and then the layer 208.3 containing the luminophore, and, where applicable, additional layers—can be applied onto a superhydrophobic PVDF film as functional layers of the optochemical sensor spot. In order to connect the PVDF membrane to the first additional layer to be applied thereto, which first additional layer may consist of silicone, for example, the film can be initially activated by a plasma treatment at least on its side intended for contact with the additional layer, in order to improve the adhesion of the silicone layer. The multi-layer membrane produced in this way can lastly be glued onto the substrate 231.

In a fourth method variant, several layers based on a fluoropolymer can be applied on top of each other onto a glass substrate 231, wherein a luminophore is immobilized in one of the layers and an additional layer lying on top of it is blackened by a pigment contained in the fluoropolymer. Onto the fluoropolymer sensor spot produced in this way, a final layer that is made of PVDF, intended for contact with the measuring fluid, and superhydrophobic at least on its surface facing the measuring fluid can be applied by fixing a superhydrophobic PVDF film by a physical method, e.g., by tempering or welding, directly onto the uppermost layer of the fluoropolymer sensor spot.

What is claimed is:

1. A sensor for determining measured values of a measured variable representing an analyte content of a measuring fluid, comprising:
   a measuring probe including a probe housing, the probe housing including a probe body and a probe cap releasably connected to the probe body, wherein the probe housing has an immersion region immersible into the measuring fluid; and
   a membrane arranged in the immersion region and fixed on a cap base body of the probe cap, wherein the membrane includes a first layer formed from a polymer, the first layer having a superhydrophobic surface that is in contact with the measuring fluid when the immersion region is immersed into the measuring fluid.

2. The sensor according to claim 1, wherein the first layer is made from polyvinylidene fluoride (PVDF) or polytetrafluoroethylene (PTFE).

3. The sensor according to claim 1, wherein the analyte is gaseous and includes at least one of the following: $O_2$, $ClO_2$, $Cl_2$, $CO_2$, and $NH_3$, and wherein the first layer is permeable to the analyte.

4. The sensor according to claim 1, wherein the first layer has a thickness from 1 micrometer (μm) to 200 μm.

5. The sensor according to claim 1, wherein the membrane is fixed on the cap base body using a material connection or a positive connection.

6. The sensor according to claim 1, wherein a housing chamber that is closed by the membrane is formed in the probe housing.

7. The sensor according to claim 6, wherein in the housing chamber is contained an internal electrolyte which wets the membrane at a rear surface of the membrane facing the housing chamber.

8. The sensor according to claim 7, wherein the internal electrolyte is an aqueous solution containing at least one electrolyte salt, and wherein the rear surface of the membrane is superhydrophobic.

9. The sensor according to claim 8, wherein the measuring probe further includes a potentiometric measuring sensor at least partially disposed in the housing chamber and in contact with the internal electrolyte and embodied to generate an electrical digital measurement signal dependent on a pH value of the internal electrolyte.

10. The sensor according to claim 7, further comprising:
at least two electrodes disposed in the housing chamber and in contact with the internal electrolyte,
wherein the measuring probe further includes a measurement circuitry disposed in the probe housing, outside the housing chamber, and electrically conductively connected to the at least two electrodes.

11. The sensor according to claim 1, wherein the sensor is an optochemical sensor, wherein the membrane further includes a second layer arranged on a side of the first layer facing away from the measuring fluid, and wherein the second layer includes an indicator substance.

* * * * *